(12) United States Patent
Watt et al.

(10) Patent No.: US 11,084,369 B2
(45) Date of Patent: Aug. 10, 2021

(54) HYBRID TRANSMISSION MODULE FOR WORK VEHICLES

(71) Applicant: Deere & Company, Moline, IL (US)

(72) Inventors: Dwayne B. Watt, Bartlesville, OK (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 263 days.

(21) Appl. No.: 16/286,324

(22) Filed: Feb. 26, 2019

(65) Prior Publication Data

US 2020/0269673 A1 Aug. 27, 2020

(51) Int. Cl.
| | |
|---|---|
| *B60K 6/40* | (2007.10) |
| *B60K 6/405* | (2007.10) |
| *B60K 6/48* | (2007.10) |

(52) U.S. Cl.
CPC ............. *B60K 6/405* (2013.01); *B60K 6/48* (2013.01); *B60K 2006/4808* (2013.01)

(58) Field of Classification Search
CPC .................................................. B60K 6/405
See application file for complete search history.

(56) References Cited

U.S. PATENT DOCUMENTS

| | | | |
|---|---|---|---|
| 6,023,134 A | 2/2000 | Carl et al. | |
| 7,135,785 B2 * | 11/2006 | Kropp | B60K 25/06 |
| | | | 290/400 |
| 9,096,115 B2 | 8/2015 | Ho et al. | |
| 9,402,344 B1 | 8/2016 | Wenzel et al. | |
| 9,656,573 B2 * | 5/2017 | Kim | B60W 20/00 |
| 10,099,552 B2 | 10/2018 | Long et al. | |
| 2005/0120715 A1 | 6/2005 | Labrador | |
| 2005/0282675 A1 * | 12/2005 | Oliver | B60K 6/365 |
| | | | 475/5 |
| 2008/0269011 A1 * | 10/2008 | Sopko | B60W 10/06 |
| | | | 477/34 |
| 2009/0115353 A1 * | 5/2009 | Heap | B60W 10/06 |
| | | | 318/8 |
| 2009/0118935 A1 * | 5/2009 | Heap | B60K 6/445 |
| | | | 701/54 |
| 2011/0215588 A1 | 9/2011 | Gilbert, Jr. | |

(Continued)

FOREIGN PATENT DOCUMENTS

| | | |
|---|---|---|
| DE | 4217300 A1 | 8/1994 |
| DE | 10303050 B4 | 5/2006 |

(Continued)

*Primary Examiner* — Alex C Dunn
(74) *Attorney, Agent, or Firm* — Klintworth & Rozenblat IP LLP

(57) ABSTRACT

A hybrid transmission module for a work vehicle is provided. The work vehicle has a chassis and a prime mover carried by the chassis, and the hybrid transmission module includes a mounting bracket configured to mount to one or more of the chassis and the prime mover, a transmission assembly mounted to the mounting bracket, and a hydraulic-electric drive assembly including a manifold mounted to the mounting bracket. The manifold mounts a hydraulic pump and an electric machine and is configured to transfer rotational power from the prime mover to the hydraulic pump and the electric machine. The electric machine, at least in part, drives the transmission assembly.

18 Claims, 12 Drawing Sheets

(56) References Cited

U.S. PATENT DOCUMENTS

| | | | |
|---|---|---|---|
| 2013/0090771 A1* | 4/2013 | Kim | E02F 9/2246 |
| | | | 700/279 |
| 2013/0149093 A1* | 6/2013 | Kaneko | B60K 6/46 |
| | | | 414/685 |
| 2013/0296136 A1* | 11/2013 | Doering | B60K 6/48 |
| | | | 477/167 |
| 2015/0008677 A1 | 1/2015 | Brock | |
| 2015/0114780 A1* | 4/2015 | Frait | B60K 6/40 |
| | | | 192/3.25 |
| 2015/0166050 A1* | 6/2015 | Frait | B60W 10/02 |
| | | | 477/5 |
| 2015/0239336 A1* | 8/2015 | Kasuya | B60L 50/16 |
| | | | 74/661 |
| 2017/0271955 A1* | 9/2017 | Hanumalagutti | B60K 1/00 |
| 2018/0093564 A1* | 4/2018 | Long | A01D 69/025 |

FOREIGN PATENT DOCUMENTS

| | | |
|---|---|---|
| DE | 102010004596 A1 | 7/2011 |
| DE | 102010010578 B4 | 3/2014 |
| DE | 102015118535 A1 | 5/2017 |
| WO | 2017149526 A3 | 9/2017 |

\* cited by examiner

HYBRID TRANSMISSION MODULE FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to transmissions for work vehicles.

BACKGROUND OF THE DISCLOSURE

Various work vehicles used in the agriculture, construction, and forestry industries have conventional torque converter transmission assemblies that fit within a defined space envelope of the work vehicles. Such work vehicles may vary in the space available to accommodate the torque converter transmission assemblies. Accordingly, these components may be configured differently for different work vehicles. Accommodating the various configurations may increase installation time and repair time and require a larger inventory of components.

Furthermore, it may be desirable to convert the transmission assemblies of older work vehicles to newer, more technologically advanced assemblies, which may not fit within the available space envelope of the older work vehicles. Alternatively, significant modification and/or manual labor may be required to accommodate the updated transmission assemblies.

SUMMARY OF THE DISCLOSURE

The present disclosure provides a modular hybrid transmission assembly for work vehicles.

In one aspect, the disclosure provides a hybrid transmission module for a work vehicle having a chassis and a prime mover carried by the chassis. The hybrid transmission module including a mounting bracket configured to mount to one or more of the chassis and the prime mover, a transmission assembly mounted to the mounting bracket, and a hydraulic-electric drive assembly including a manifold mounted to the mounting bracket. The manifold mounting a hydraulic pump and an electric machine and configured to transfer rotational power from the prime mover to the hydraulic pump and the electric machine. The electric machine, at least in part, drives the transmission assembly.

In another aspect, the disclosure provides a work vehicle including a chassis, a prime mover carried by the chassis and including a rotational drive shaft for producing rotational power, a mounting bracket configured to mount to the chassis, and a hydraulic-electric drive assembly. The hydraulic-electric drive assembly includes a manifold mounted to the mounting bracket, a hydraulic pump mounted to the manifold, and an electric machine mounted to the manifold. The hydraulic-electric drive assembly is configured to transfer the rotational power from the prime mover to the hydraulic pump and the electric machine. The electric machine is configured to produce direct current electrical power. The work vehicle also including an inverter electrically coupled to the electric machine to receive the direct current electrical power from the electric machine and output alternating current electrical power, and a transmission assembly mounted to the mounting bracket and driven by the alternating power from the inverter. The inverter is mounted to the transmission assembly.

The details of one or more embodiments are set forth in the accompanying drawings and the description below. The components in the figures are not necessarily to scale, emphasis instead being placed upon illustrating the principles of the disclosure. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
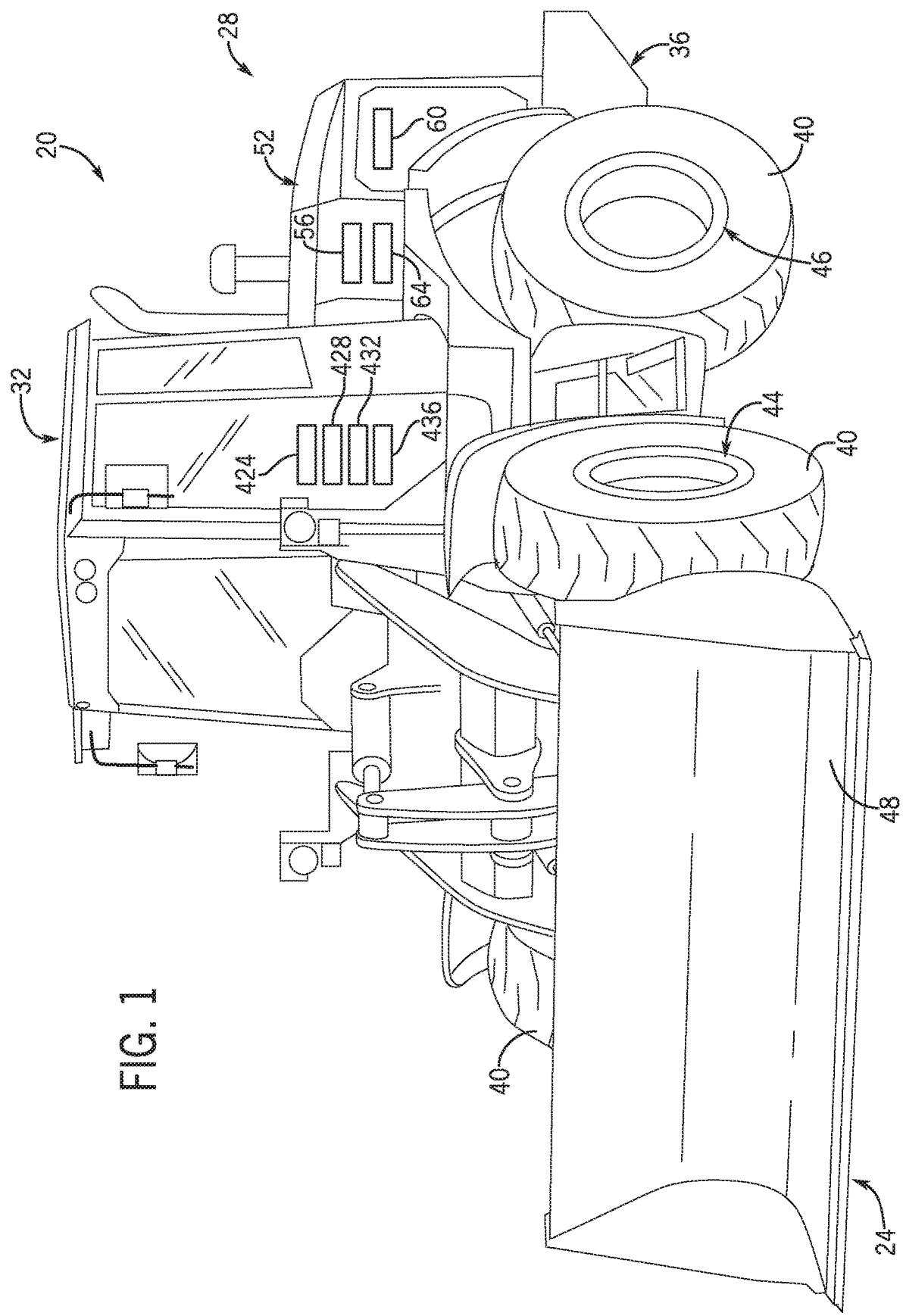
FIG. 1 is a front perspective view of one example work vehicle with one example hybrid transmission module.

The following describes one or more example embodiments of the disclosed work vehicle, hybrid transmission module, and control system for the work vehicle and hybrid transmission module, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft,"

"rear," "lateral," "horizontal," and "vertical" may be used. Such terms are defined, at least in part, with respect to the direction in which the work vehicle travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. Alternatively, the term "longitudinal axis" may be defined with respect to an individual component to which the longitudinal axis relates and be independent of the orientation relative to the overall work vehicle. The term "vertical," as appearing herein, may refer to an axis or a direction orthogonal to the horizontal plane containing the fore-aft and lateral axes.

Work vehicles are used in a wide variety of industries and are configured to perform a wide variety of operations. Example industries include, but are not limited to, agriculture, construction, and forestry. Example operations include, but are not limited to, planting crops, harvesting crops, earth moving, digging, drilling, grading, cutting trees, moving cut timber, among many other operations. Such work vehicles require necessary power to operate in these industries and perform the associated operations. The necessary power may be generated in various manners in such work vehicles. However, work vehicles have a predetermined space envelope and/or footprint within an engine or other compartment which the necessary components are positioned to generate the necessary power.

Various types of power generator components have different shapes and sizes and interchanging the type of power generating components within the predetermined space may be difficult. For example, work vehicles may include predetermined envelopes or footprints to accommodate a conventional torque converter transmission. It may be desirable to alter the torque converter transmission with a different assembly of components to provide the desired amount of power generation. One example of a replacement assembly may include a hybrid transmission module including a transmission assembly, a hydraulic-electric drive assembly, and an inverter. In order to facilitate easy replacement and installation of the hybrid transmission module into the space within the compartment of the work vehicle accommodating the transmission components being replaced, the hybrid transmission module may include a mounting bracket, which is mounted to the transmission assembly and the hydraulic-electric drive assembly. The inverter may be mounted to the transmission assembly. Thus, a single assembly or module is provided by mounting the mounting bracket, the transmission assembly, the hydraulic-electric drive assembly, and the inverter in this manner. This single assembly or module may then be easily inserted or otherwise positioned into the existing accommodating space of the work vehicle and the mounting bracket may be coupled to one or both of a chassis of the work vehicle and/or a prime mover or engine of the work vehicle.

The following discussion of one or more example implementations of the transmission module and method disclosed herein may sometimes focus on a front loader application of a work vehicle. In other examples, the disclosed transmission module and method may be utilized with other types of work vehicles such as, for example, graders, tractors, trucks, among other types of work vehicles in the construction, agricultural, and forestry industries. Further, the following describes one or more example implementations of the disclosed hybrid transmission module in a front loader work vehicle, as shown in the accompanying figures of the drawings described briefly above. Generally, the disclosed hybrid transmission module and the front loader work vehicles in which it is implemented provides for installation in various work vehicles having various sized compartments as well as easier and more efficient replacement of existing power providing components as compared to conventional systems and arrangements.

Referring now to FIG. 1, one example of a work vehicle 20 is illustrated. In the illustrated example, the work vehicle 20 is a front loader. However, the principles of the present disclosure may be utilized in a wide variety of work vehicles. The work vehicle 20 is presented in an isometric view in FIG. 1, with a front 24 of the work vehicle 20 facing to the left and a rear 28 of the work vehicle 20 facing to the right. The work vehicle 20 may include a cab 32 to seat an operator, as well as a chassis 36 supporting various work components of the work vehicle 20. In certain examples, the chassis 36 is supported by wheels 40 through front and rear drive axle assemblies 44, 46. In other examples, the chassis 36 may be supported by a transport frame such as track frame supporting track assemblies.

The work vehicle 20 includes a front end loading device 48 configured to engage, scoop, and hold earth or other material or objects desired to be moved or transported by the work vehicle 20. The work vehicle 20 is transported or moved along the ground by the wheels 40 and associated front and rear drive axle assemblies 44, 46 (or track assemblies in the alternative). The work vehicle 20 also includes an engine compartment 52 in which a prime mover or engine 56 is positioned to supply power to the work vehicle 20 such as, for example, driving the work vehicle 20 along the ground and for powering various hydraulic and/or electric components of the work vehicle 20. The work vehicle 20 may also include a storage battery 60 for providing electric ignition in the event the engine 56 requires a spark for combustion. The storage battery 60 may also be used to supplement or supplant the engine 56 in powering various electric components of the work vehicle 20. Various devices within the work vehicle 20 may be driven via one or more hydraulic motors that are indirectly powered by the engine 56. Various other devices within the work vehicle 20 may be driven via electric motors that are indirectly powered by the engine 56.

Figure 2:
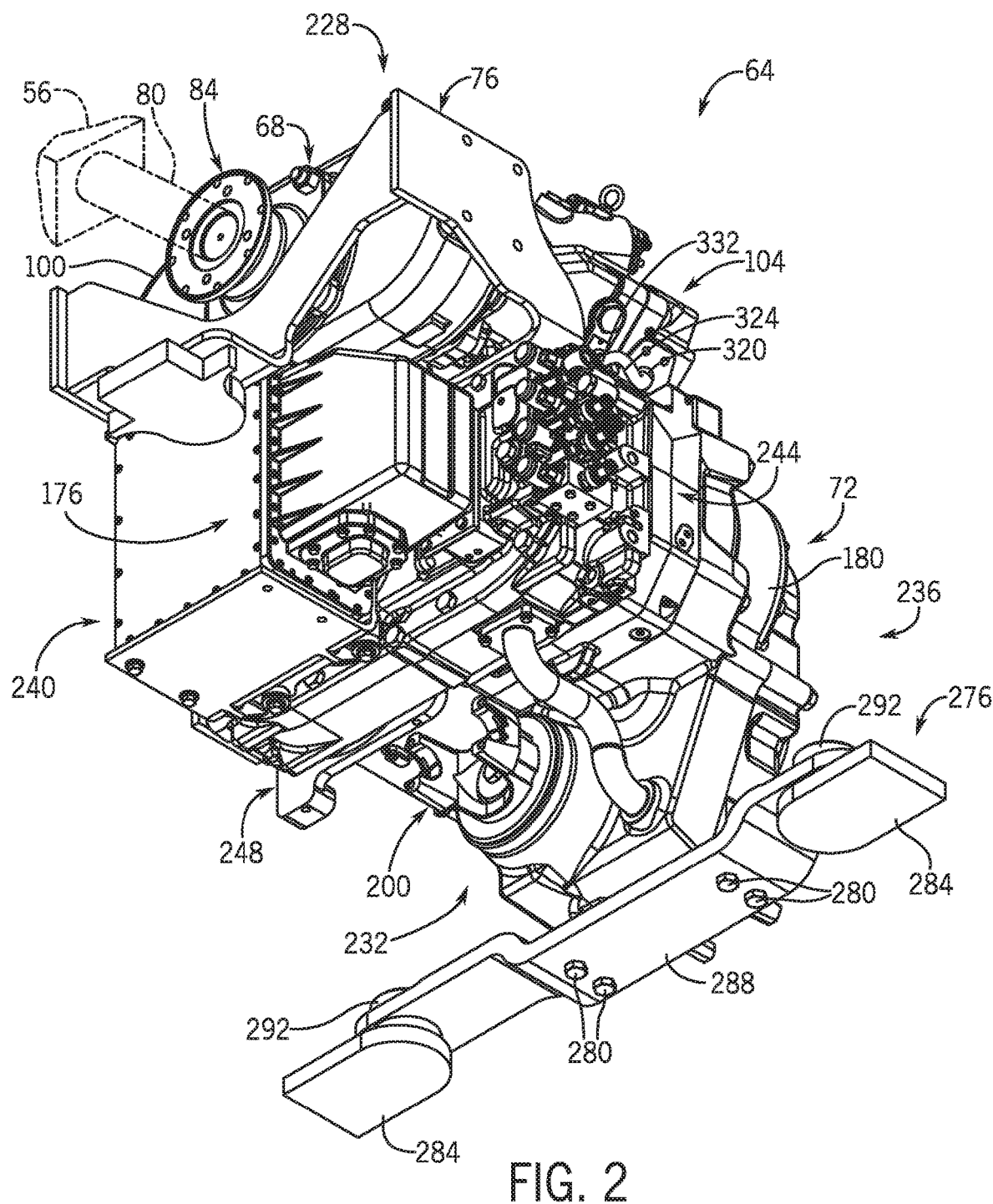
FIG. 2 is a perspective view of the example hybrid transmission module of FIG. 1 with one example prime mover and drive shaft coupled to the hybrid transmission module.
Figure 3:
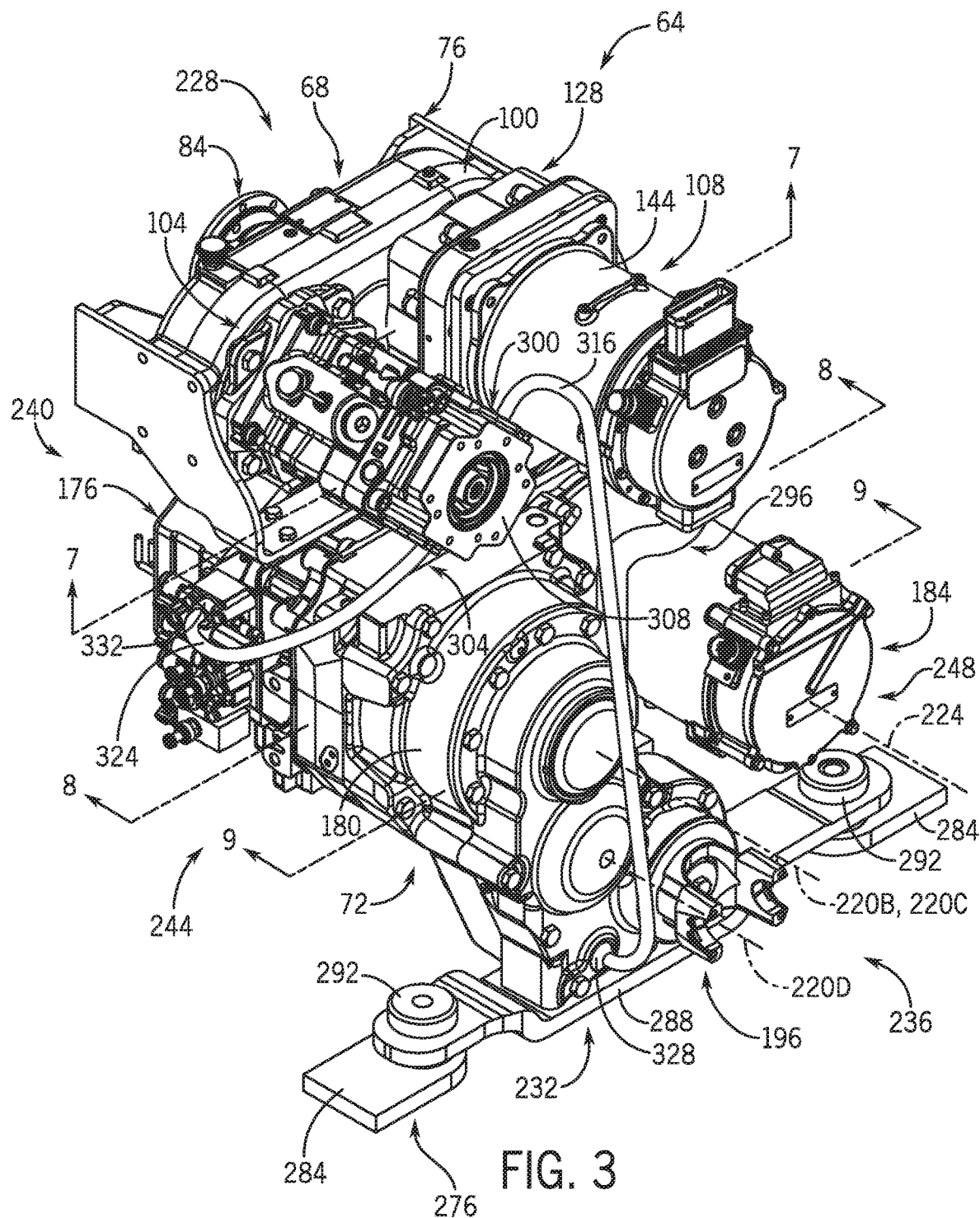
FIG. 3 is another perspective view thereof.
Figure 4:
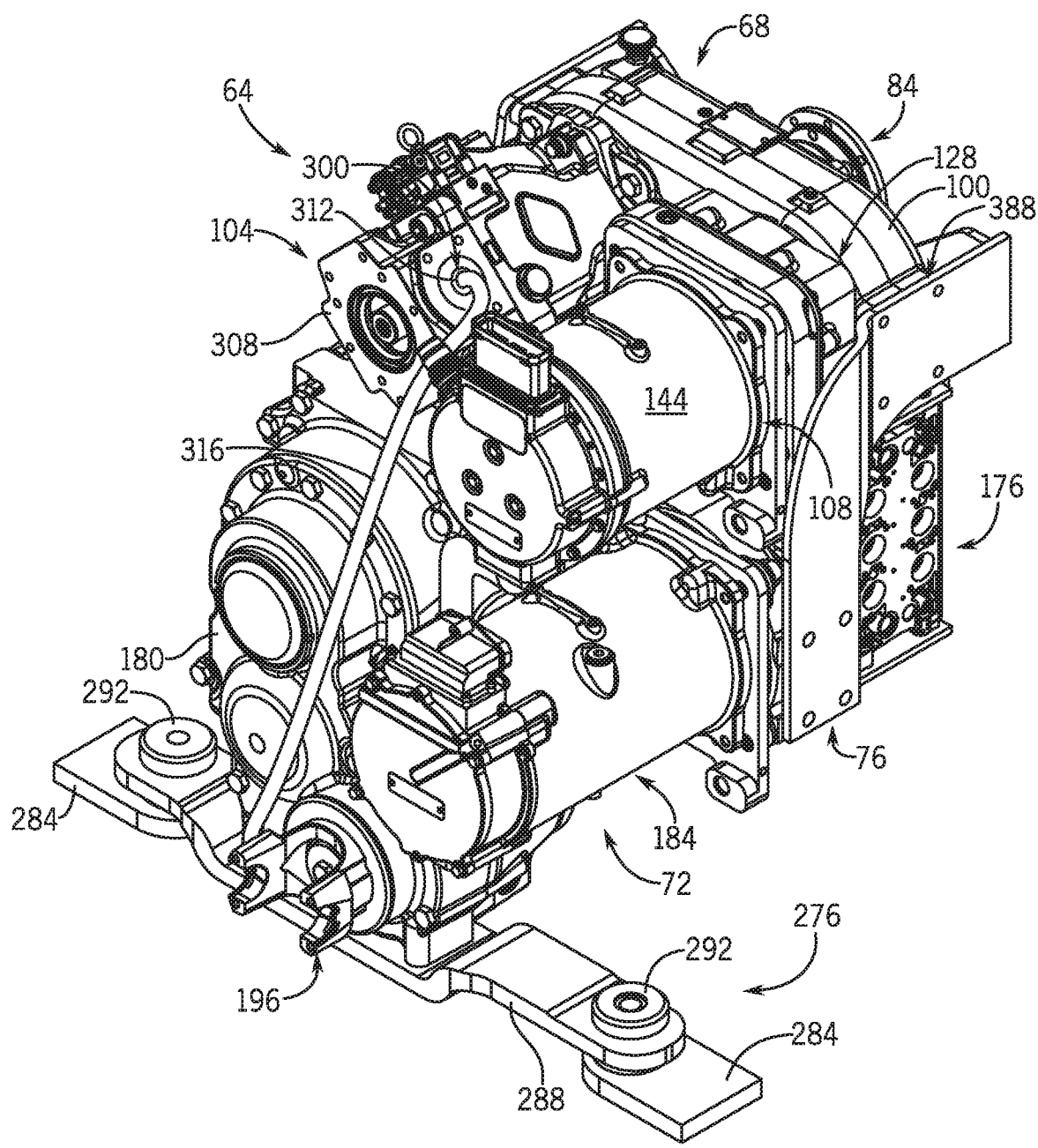
FIG. 4 is another perspective view thereof.
Figure 12:
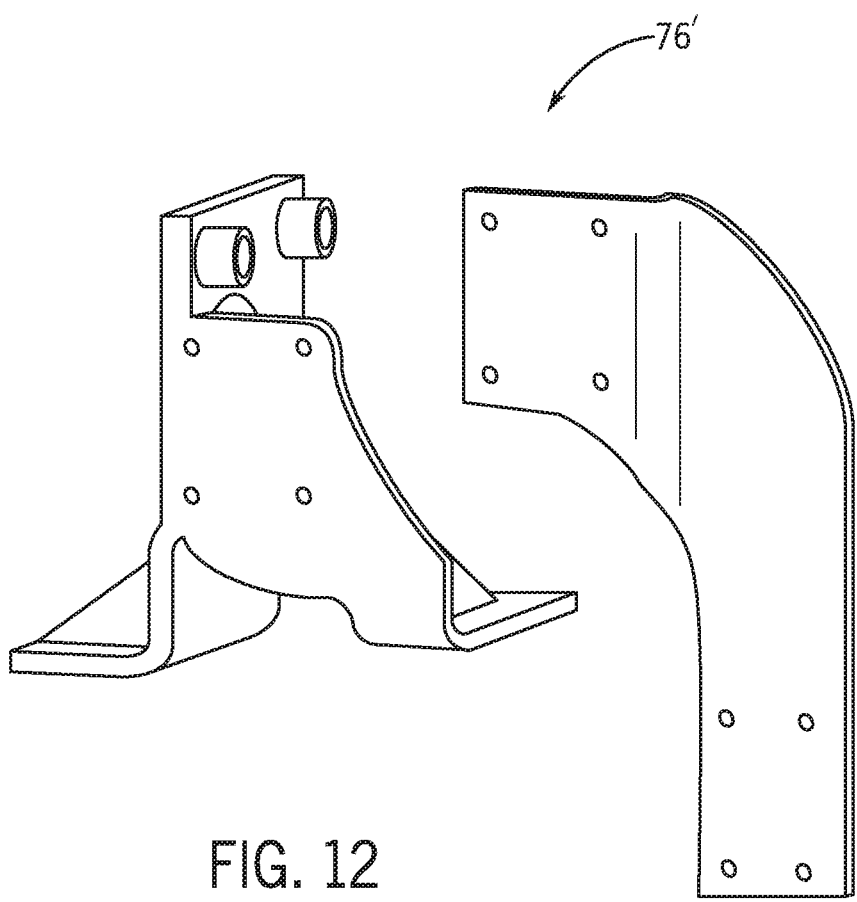
FIG. 12 is a perspective view of an example mounting bracket of the hybrid transmission module.

Referring now also to FIGS. 2-4, an example hybrid transmission module 64 is illustrated and includes a hydraulic-electric drive assembly 68 including a combination of hydraulic components and electrical components. The hybrid transmission module 64 also includes a transmission assembly 72 for transmitting power to the front and rear drive axle assemblies 44, 46 for driving the wheels 40. One example of a mounting bracket 76 is illustrated and is used to, at least partially, mount the components of the hybrid transmission module 64 together to form a single module or assembly and is used to mount the hybrid transmission module 64 within the engine compartment 52 of the work vehicle 20. The mounting bracket 76 is configured to have different configurations and such configurations may be dependent upon one or more of the configuration of the hybrid transmission module 64, the type of work vehicle 20 in which the hybrid transmission module 64 is to be positioned, among other considerations. For example, the mounting bracket 76 may be a unitarily formed, one-piece component. In other examples, the mounting bracket 76 may include a plurality of portions 76a, 76b either coupled together or spaced-apart from one another (see e.g., FIG. 12). In the state illustrated in FIGS. 2-4, the hybrid transmission module 64 is a single module or assembly that may be easily dropped-in or positioned into an engine compartment 52 of the work vehicle 20 and mounted to the chassis 36 and/or the prime mover 56 of the work vehicle 20.

Figure 5:
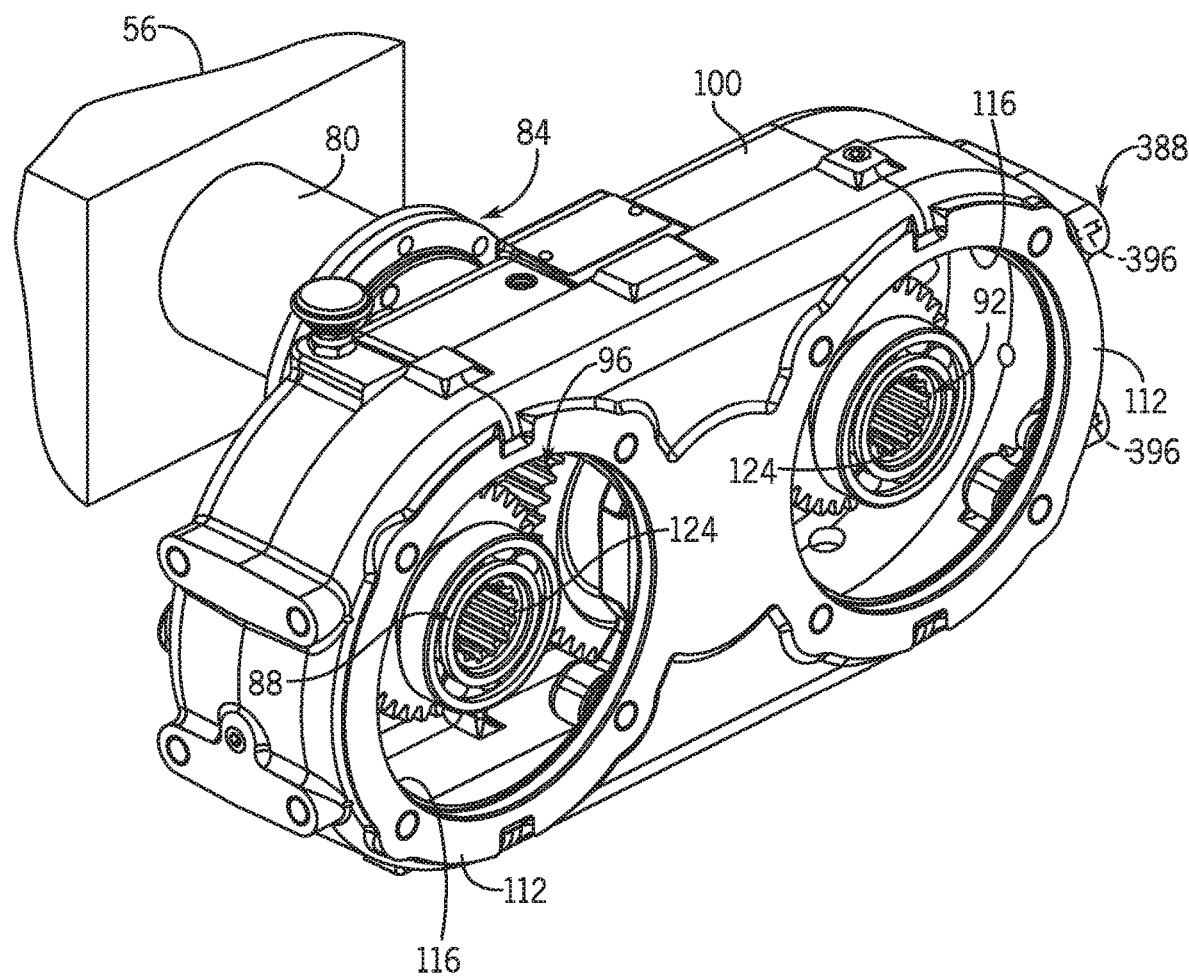
FIG. 5 is a perspective view of a portion of a hydraulic-electric drive assembly of the hybrid transmission module shown in FIG. 2 coupled to the prime mover and the drive shaft.

With continued reference to FIGS. 2-4 and additional reference to FIGS. 5-7, the hydraulic-electric drive assembly 68 is illustrated and will be described in more detail. The hydraulic-electric drive assembly 68 couples to the engine 56 and receives input power via a drive shaft 80. The drive shaft 80 is coupled to an input interface 84 of the hydraulic-electric drive assembly 68 so as to transfer power to each of a plurality of output interfaces 88, 92. In the illustrated example, a splined connection may couple the input interface 84 to the drive shaft 80 for correlation therewith so as to receive the power (rotational speed and torque) imparted to the drive shaft 80 from the engine 56. The input interface 84 in turn transfers the received power (i.e., the rotational speed and torque) to the output interfaces 88, 92 via intermeshing of teeth at peripheries of the input interface 84 and the output interfaces 88, 92, such as at meshing area 96 shown in FIG. 5. The input interface 84 will impart a nominal fractional power output to each output interface 88, 92 in accordance with the number of output interfaces present. In the illustrated example, there are two output interfaces 88, 92, each nominally receiving one-half of the power from the input interface 84. Further, each output interface 88, 92 may have the same or different power output as one another depending on their relative tooth counts, and depending on the relative tooth count of the respective input interface 84 and the output interfaces 88, 92 (i.e., the gear ratio), the output interfaces 88, 92 may have the same or different rotational speed as the input interface 84. In the illustrated example, each output interface 88, 92 is identical. The common tooth count effects the same gear ratio with respect to the input interface 84 for each of the two output interfaces 88, 92, and thus each output interface 88, 92 provides the same output power (rotational speed and torque). In the example configuration, the input interface 84 has a greater tooth count than each of the output interfaces 88, 92, and thus the half power distribution is effected through a common higher speed, lower torque power flow through each output interface 88, 92. In the example configuration, this power is transferred through a splined annulus that rotates about an associated rotation axis, each of which is generally in parallel with one another and a rotation axis in common with the drive shaft and the input interface.

As depicted, the input interface 84 and the two output interfaces 88, 92 of the example hydraulic-electric drive assembly 68 may be contained within and/or mounted to a manifold housing 100, which together may form what may be conventionally considered a "hydraulic pump drive". However, here, the hydraulic pump drive in fact serves to drive both hydraulic and electric components. Specifically, in the example configuration, there is one hydraulic pump 104 and one electric machine or generator 108. It should be understood, however, that the hydraulic-electric drive assembly 68 may include any number of output interfaces and various combinations of hydraulic and electric components could be incorporated into the disclosed assembly, including multiples of both hydraulic and electric components or a single hydraulic component and multiple electric components, or any other permutation of hydraulic and electric components.

The hydraulic and electric components may mount directly to the manifold housing 100, or couple thereto via intermediate mounting or other components. Further, the hydraulic and electric components may mount to the manifold housing 100 by direct or indirect connection to an outer mounting surface or "pad" 112. In the illustrated example, each mounting pad 112 is defined by a raised ring circumscribing an opening 116 in the manifold housing 100 for each output interface 88, 92. Each mounting pad 112 may be different, such as configured in a complementary fashion to mate with a specific hydraulic or electric component. Alternatively, the mounting pads 112 may have a common configuration, such as in the example embodiment, in which case any one of the output interfaces 88, 92 could accommodate any hydraulic or electric component having a complementary (common) mating surface. Thus, any of the output interfaces 88, 92 could couple to, and any of the mounting pads 112 could mount, the example hydraulic pump 104 and the example electric machine 108.

The hydraulic pump 104 may be any suitable conventionally-configured hydraulic pump, such as an axial piston pump, with a splined or toothed shaft 120 (see FIGS. 6 and 7) to couple with an annulus 124 of the output interface 88 and a common complementary mating surface to that of the mounting pads 112 and which may be bolted directly to the manifold housing 100. As such, the construction and mounting of the hydraulic pump 104 will not be detailed here. The output interface 88 may provide the requisite gear ratio (speed and torque) for driving the hydraulic pump 104 directly.

The electric machine 108, on the other hand, may operate at significantly different speed and torque requirements (e.g., running at a relatively higher speed and lower torque) than the hydraulic pump 104. To facilitate this, the electric machine 108 includes a gear box 128 that provides the requisite gear ratio for the electric machine 108. Like the hydraulic pump 104, the electric machine 108 may be any suitable conventional electric machine, such as an induction generator, having a shaft turning a rotor with respect to a stator. The electric machine 108 will thus not be detailed herein.

Figure 6:
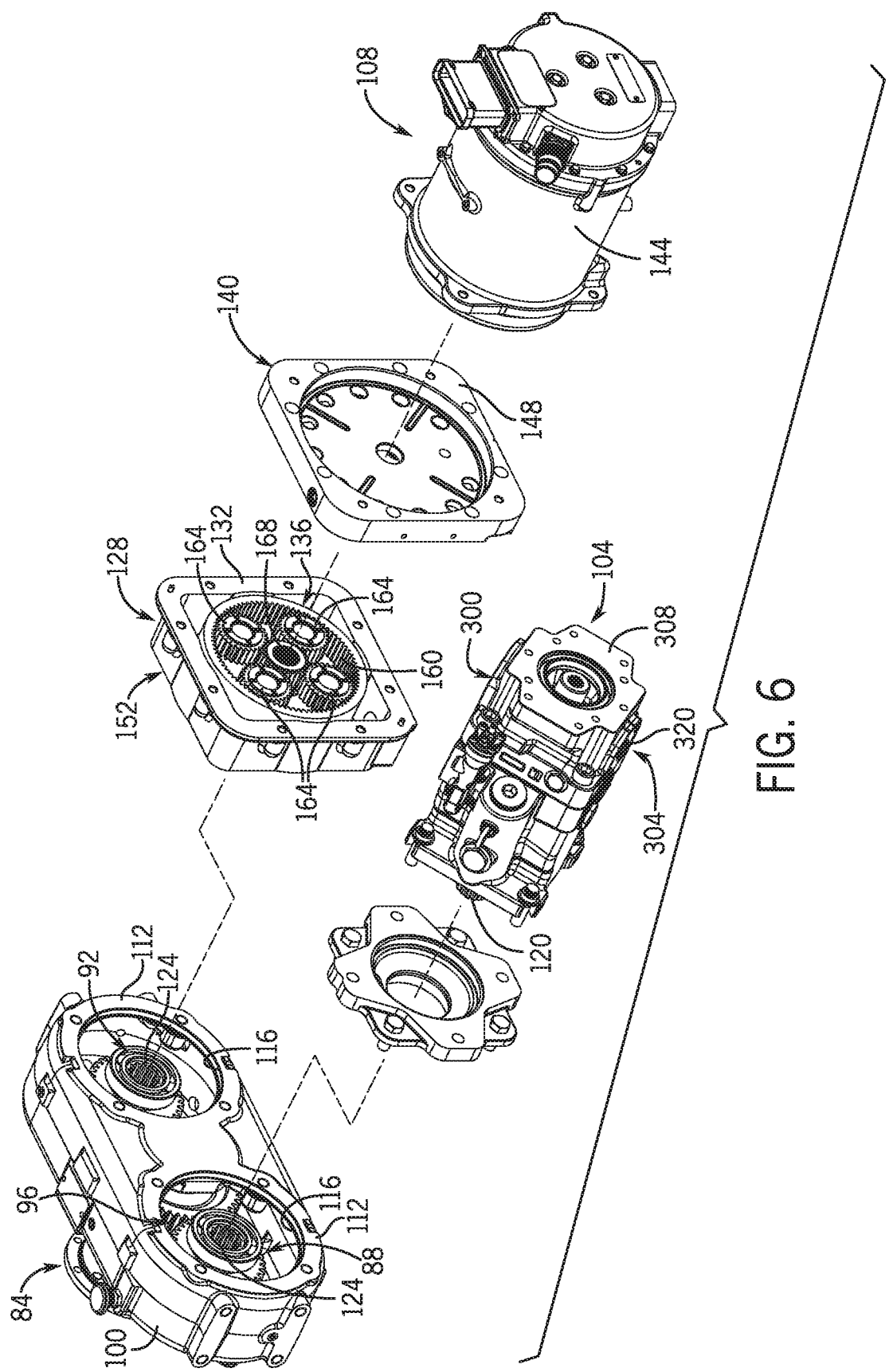
FIG. 6 is an exploded view thereof with one example of a hydraulic pump and one example of an electric machine.
Figure 7:
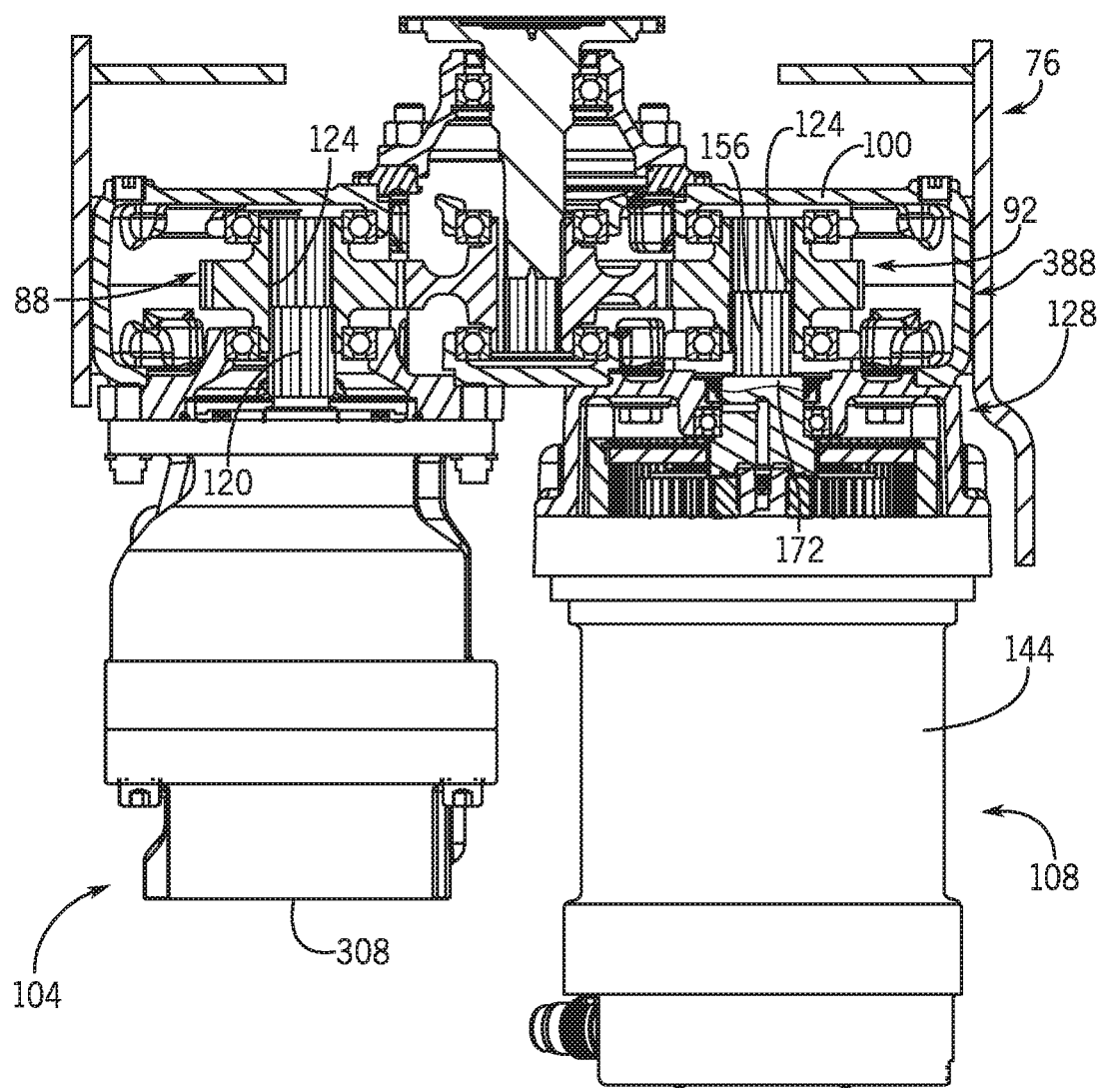
FIG. 7 is a cross-sectional view taken along line 7-7 in FIG. 3.

With particular reference to FIGS. 6 and 7, the gear box 128 may be any suitable gear mechanism providing the requisite gear ratio, such a positive gear ratio stepping up the rotational speed and reducing the torque relative to that input from the engine 56. In the example embodiment, the gear box 128 is a planetary gear set, and in particular, a ring-in, sun-out, fixed-carrier, single-stage planetary gear set. Specifically, the gear set includes a gear housing 132, defining an open ended gear chamber 136, and an end plate 140, mounted to the gear housing 132 to close the gear chamber 136. The end plate 140 attaches to the gear housing 132 and to a housing 144 for the electric machine 108 via mechanical fasteners (e.g., bolts) or other connection techniques. The end plate 140 provides a raised mounting surface or pad 148 for the electric machine 108 in a manner similar to the mounting pads 112 of the manifold housing 100. Opposite its open end, the gear housing 132 defines another mounting surface 152 of a complementary configuration to that of the associated mounting pad 148, such that, the gear housing 132 mounts directly to (i.e., is in physically abutting relation with) the manifold housing 100. This end of the gear housing 132 also projects into the manifold housing 100 through the associated opening 116 and may be secured to the manifold housing 100 by mechanical fasteners, welding or other connection techniques. This end of the gear housing 132 also has a central opening in which various bearings are mounted that support a hub 156 of a ring gear 160 for rotation with respect to the gear housing 132. The ring gear hub 156 is configured to couple with the associated output interface 92, for example, by external splines that mate with internal splines of the output interface 92. The internal teeth (or splines) of the ring gear 160 mate with teeth (or splines) of a set (e.g., four) planet gears 164, which are mounted for rotation by a fixed carrier (and thus do not orbit) and which engage the teeth (or splines) of a sun gear 168. As shown, the planet carrier may be a unitary part of the end plate 140 or secured thereto in a fixed manner by any suitable mechanical fastener or other connection technique. The sun gear 168 may be a unitary part of, or fixed to, a shaft 172 of the electric machine 108.

There has thus been provided example embodiments of a hydraulic-electric drive assembly 68, which is suitable for driving both hydraulic and electric components of a work vehicle 20. The hydraulic and electric components are coupled to the prime mover 56 (e.g., an engine) via one or more intermediary components. In certain embodiments, both the hydraulic components and the electric components may be coupled to power through the input interface 84 and the output interfaces 88, 92 of a shared manifold housing 100, such as that used in hydraulic pump drive units. In certain embodiments, the interface of the hydraulic and electric components may be of a common, or identical, configuration such that either a hydraulic component or an electric component may be coupled to any interface. Moreover, in certain embodiments there may be a single hydraulic component and a single electric component, or there may be multiple of either or both. In certain embodiments, each hydraulic component is a hydraulic pump 104 and each electric component is an electric machine 108, which is configured to transmit electric power to a downstream electric component of the work vehicle 20. The electric machine 108 may incorporate a gear set that effects a gear ratio as needed to deliver an appropriate speed and torque to the electric machine 108. The speed and torque at which the electric machine 108 may be different (e.g., higher speed and lower torque) than that at which a hydraulic pump 104 is driven. In this way, additional hardware, which would otherwise significantly enlarge the space envelope and increase the complexity and cost of the drive, may be minimized or avoided.

In some examples, the electric machine 108 is configured to generate direct current electrical power and may be electrically coupled to a variety of other components of the hybrid transmission module 64 and/or work vehicle 20 as desired. In one example, the electric machine 108 is electrically coupled to an inverter 176 and the direct current electrical power is conveyed from the electric machine 108 to the inverter 176. As is understood, the inverter 176 is configured to convert the direct current electrical power to alternating current electrical power. The inverter 176 of the present disclosure is capable of being a wide variety of types of inverters having a wide variety of performance capabilities. The inverter 176 may be electrically coupled to a variety of other components of the hybrid transmission module 64 and/or the work vehicle 20 as desired for providing alternating current to such components.

Referring again to FIGS. 2-4, the transmission assembly 72 of the hybrid transmission module 64 is illustrated and will be described in greater detail herein. The transmission assembly 72 includes a transmission housing 180 and a second electric machine 184 mounted to the transmission housing 180 and including an output shaft 188. The transmission assembly 72 also includes a gear set 192 positioned within the transmission housing 180 and coupled to the output shaft 188 of the second electric machine 184. The transmission assembly 72 further includes a pair of drive output members 196, 200 coupled to the gear set 192 and configured to respectively couple to a front drive axle assembly 44 and a rear drive axle assembly 46 of the work vehicle 20. In some examples, only one drive axle assembly of the work vehicle 20 may be driven and, in such an example, the transmission assembly 72 may only include a single drive output member 196 or 200 coupled to the gear set 192 and the drive axle assembly of the work vehicle 20. As indicated above, the alternating current generated by the inverter 176 may be transmitted to the second electric machine 184 to power the second electric machine 184. The second electric machine 184 drives the output shaft 188 thereof, which includes a drive gear 204 fixedly coupled to and rotatable with the output shaft 188 of the second electric machine 184. The drive gear 204 meshes with a first gear 192A of the gear set 192 which meshes with a second gear 192B of the gear set 192. The second gear 192B is fixedly coupled to and rotatable with a gear set shaft 208. A third gear 192C of the gear set 192 is also fixedly coupled to and rotatable with the gear set shaft 208, but is disposed more toward a front of the transmission assembly 72 whereas the second gear 192B is disposed more toward a rear of the transmission assembly 72. The third gear 192C meshes with a fourth gear 192D of the gear set 192 and the fourth gear 192D meshes with a drive output gear 212, which is fixedly coupled to and rotatable with a drive output shaft 216. The drive output shaft 216 is coupled to the pair of drive output members 196, 200. Each of the pair of drive output members 196, 200 couple to respective front and rear drive axle assemblies 44, 46 of the work vehicle 20.

Figure 8:
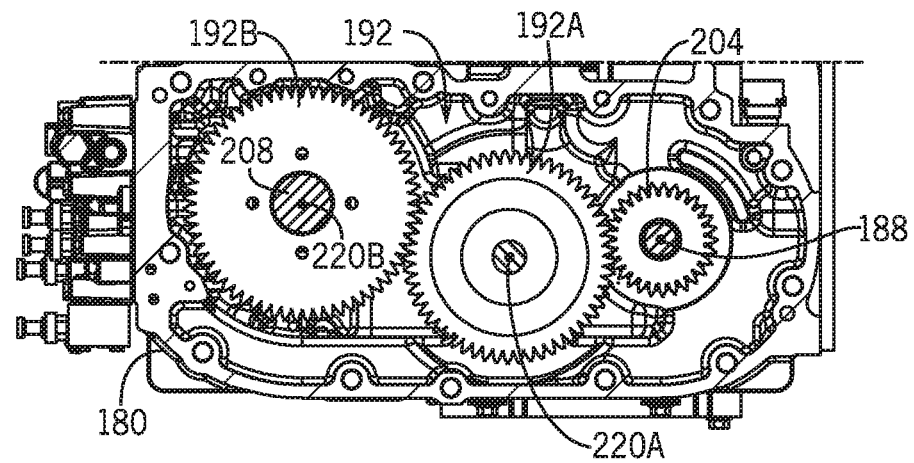
FIG. 8 is a partial cross-sectional view taken along line 8-8 in FIG. 3.
Figure 9:
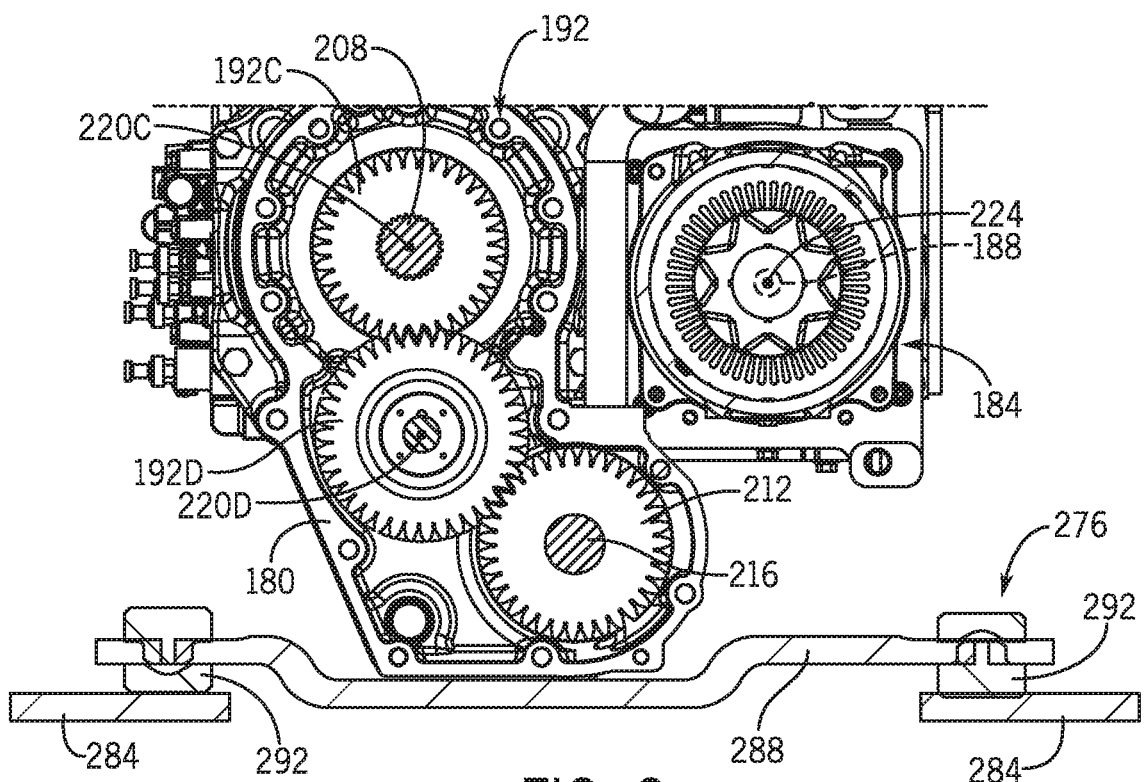
FIG. 9 is a partial cross-sectional view taken along line 9-9 in FIG. 3.

Any one of the gears of the gear set 192 are rotatable about a respective rotational axis 220A, 220B, 220C, 220D and the second electric machine 184 has a longitudinal extent that may be define by a longitudinal axis 224. In the illustrated example, and with particular reference to FIGS. 8-10, the longitudinal axis 224 is offset from the rotational axes 220A-220D of the gears 192A-192D. Moreover, the longitudinal axis 224 is offset to a left side of the rotational axes 220A-220D of the gears 192A-192D and is parallel to the rotational axes 220A-220D of the gears 192A-192D.

In the illustrated example of the hybrid transmission module 64 the components thereof are arranged relative to each other to allow the hybrid transmission module 64 to fit into spaces of work vehicle compartments that may have been manufactured to contain conventional power systems and to facilitate easy replacement of the conventional power systems with the hybrid transmission module 64 of the present disclosure. With particular reference to FIGS. 2-4 and 10, the hybrid transmission module 64 can be considered to have a top 228, a bottom 232 opposite the top 228, a front 236 associated with the front 24 of the work vehicle 20, a rear 240 opposite the front 236 and associated with the rear 28 of the work vehicle 20, a right side 244, and a left side 248 opposite the right side 244. Similarly, but with respect to the transmission assembly 72, the transmission assembly 72 includes a top surface 252, a bottom surface 256 opposite the top surface 252, a front surface 260 associated with the front 24 of the work vehicle 20, a rear surface 264 opposite the front surface 260 and associated with the rear 28 of the work vehicle 20, a right side surface 268, and a left side surface 272 opposite the right side surface 268. The hydraulic-electric drive assembly 68 is positioned at the top 228 of the hybrid transmission module 64 and vertically above the top surface 252 of the transmission assembly 72. The hydraulic pump 104 of the hydraulic-electric drive assembly 68 is positioned toward the right side 244 of the hybrid transmission module 64 and the first electric machine 108 is positioned to the left of the hydraulic pump 104 and toward the left side 248 of the hybrid transmission module 64. The second electric machine 184 is positioned below the first electric machine 108, to the left of the transmission assembly 72, and toward the left side 248 of the hybrid transmission module 64. The inverter 176 is positioned to the rear 240 of the hybrid transmission module 64, toward the rear surface 264 of the transmission assembly 72, and below the hydraulic-electric drive assembly 68. This configuration of the hybrid transmission module 64 is only one of a variety of possible configurations of the hybrid transmission module 64 and is not intended to be limiting. All the possible configurations of the hybrid transmission module 64 are configured to be within the spirit and scope of the present disclosure.

Referring to FIGS. 2-4, 9, and 10, the hybrid transmission module 64 may also include a suspension member 276 coupled between the hybrid transmission module 64 and the chassis 36 of the work vehicle 20. In the illustrated example, the suspension member 276 is coupled to the bottom surface 256 of the transmission assembly 72 and is positioned between the bottom surface 256 of the transmission assembly 72 and the chassis 36 of the work vehicle 20. The suspension member 276 may be coupled to the hybrid transmission module 64 in a variety of manners. In one example, the transmission assembly 72 may merely rest or be supported on the suspension member 276. In another example, the transmission assembly 72 may be rigidly connected to the suspension member 276 in a variety of manners including, but not limited to, welded, fastened (e.g., see fasteners 280 in FIGS. 2 and 10), and unitarily formed with as one-piece. The suspension member 276 may be coupled to and positioned relative to the hybrid transmission module 64 in a variety of manners. Furthermore, the suspension member 276 may have a wide variety of configurations as long as the suspension member 276 provides the necessary suspension to the hybrid transmission module 64. In the illustrated example, the suspension member 276 includes two mounting plates 284 for mounting the suspension member to the chassis 36. The mounting plates 284 may be rigidly secured to the chassis 36 of the work vehicle 20 in a variety of manners. The suspension member 276 also includes a transmission module member 288 coupled to and engaging the hybrid transmission module 64. The transmission module member 288 may be coupled to the hybrid transmission module 64 in a variety of manners and in a variety of locations on the hybrid transmission module 64 as discussed above. The suspension member 276 further includes a pair of resilient members 292 providing the suspension capability to the suspension member 276. In the illustrated example, one of the resilient members 292 is coupled between one of the mounting plates 284 and the transmission module member 288 and the other of the resilient members 292 is coupled between the other of the mounting plates 284 and the transmission module member 288. The suspension member 276 may have a wide variety of one or more components providing the suspension capabilities and the illustrated example of the resilient members 292 is not intended to be limiting.

Figure 10:
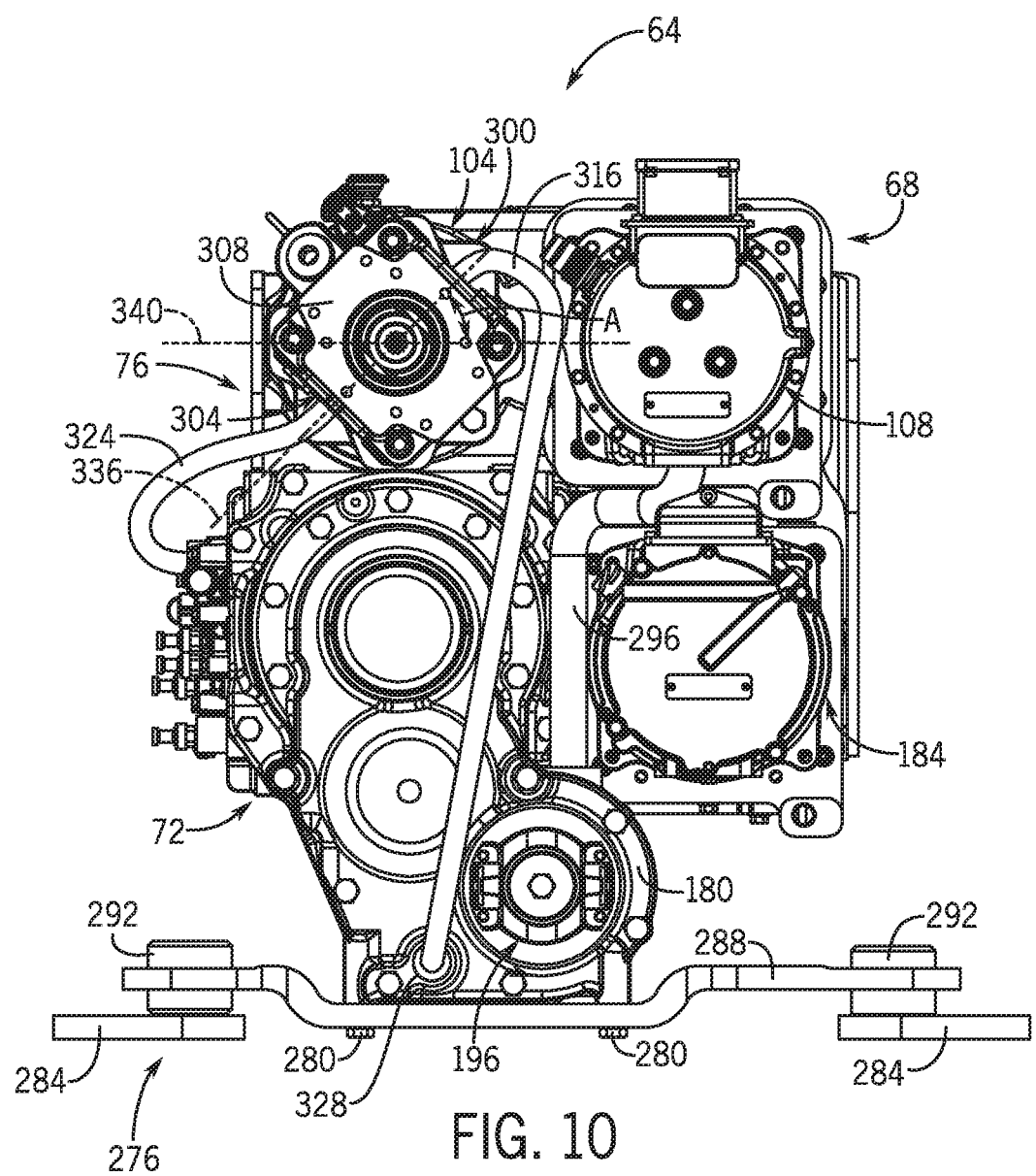
FIG. 10 is a front elevational view of the hybrid transmission module shown in FIG. 2.

Referring now to FIGS. 3, 4, and 10, the hybrid transmission module 64 also includes lubricant path 296 extending between the hydraulic-electric drive assembly 68 and the transmission assembly 72 to allow lubricant from the hydraulic-electric drive assembly 68 to flow to the transmission assembly 72. In the illustrated example, the lubricant path 296 is comprised of a hydraulic conduit 296 and extends between the first electric machine 108 and the transmission assembly 72. As indicated above, the first electric machine 108 is positioned vertically higher than the transmission assembly 72. Thus, the lubricant conduit 296 is configured to allow lubricant to flow from the first electric machine 108 to the transmission assembly 72 under the force of gravity or a gravitational force. In one example, lubricant flows through the lubricant conduit 296 solely under the force of gravity. In the illustrated example and in other examples, the hybrid transmission module 64 does not require a separate or additional pump to facilitate lubricant flow from the first electric machine 108 to the transmission assembly 72. In the illustrated example, the lubricant conduit is configured to avoid the second electric machine 184 positioned under the first electric machine 108.

With reference to FIGS. 3, 4, and 10, the hydraulic pump 104 is configured to pump fluid to the necessary components of the hybrid transmission module 64 and possibly other components of the work vehicle 20. Accordingly, the hydraulic pump 104 includes an input 300 and an output 304. In the illustrated example, the input 300 and output 304 of the hydraulic pump 104 will be identified for descriptive purposes, but it should be understood that the hydraulic pump 104 is not limited to the illustrated configuration and the input 300 and the output 304 may be switched with one another.

As can be seen best in FIG. 10, the hydraulic pump 104 has four sides generally forming a square shape in a cross-section taken along a plane extending from the right side 244 to the left side 248 of the hybrid transmission module 64 substantially parallel to a front surface 308 of the hydraulic pump 104. The input 300 of the hydraulic pump 104 includes an input fitting 312 to which an input conduct 316 couples and the output 304 of the hydraulic pump 104 includes an output fitting 320 to which an output conduit 324 couples. In the illustrated example, the input conduit 316 extends between and is coupled to the input fitting 312 and an output fitting 328 of the transmission assembly 72, and the output conduit 324 extends between and is coupled to the output fitting 320 and an input fitting 332 of the transmission assembly 72. Thus, the hydraulic pump 104 pumps lubricating fluid through the transmission assembly 72 to ensure the moving components of the transmission assembly 72 are properly lubricated.

With continued reference to FIG. 10, the illustrated configuration of the hybrid transmission module 64 positions the first electric machine 108 extremely close to the hydraulic pump 104. Since the input conduit 316 must access the input fitting 312 of the hydraulic pump 104, the hydraulic pump 104 is rotated to displace the input fitting 312 further from the first electric machine 108. As one could imagine, if the hydraulic pump 104 was not rotated as illustrated, the input fitting 312 would be extremely close to the first electric machine 108 and the input conduit 316 would not be able to access the input fitting 312. Or, if the input conduit 316 could access the input fitting 312 with the input fitting 312 in such close proximity to the first electric machine 108, the input conduit 316 may have such an extreme bend that such a bend would inhibit or restrict flow of lubricant through the input conduit 316.

Returning to the illustrated example in FIG. 10, a reference plane 336 extending through the input 300 and the output 304 of the hydraulic pump 104 is non-horizontal and/or rotationally offset from a horizontal reference plane 340 extending horizontally between the right and left sides 244, 248 of the hybrid transmission module 64. This rotational offset may be measured as offset angle A. The rotational offset of the input 300 and output 304 provides the input and output conduits 316, 324 respective access to the input and output fittings 312, 320 and moreover provides access to the input and output fittings 312, 320 without extreme bends in the input and output conduits 316, 324. The illustrated orientation of the input 300 and output 304 of the hydraulic pump 104 is only one of many possible orientations and the hydraulic pump 104 is configured to have a wide variety of orientations to adequately displace the input 300 and output 304 from the first electric machine 108 and all of such possibilities are intended to be within the spirit and scope of the present disclosure.

With reference to FIGS. 2-4, 10, and 11, the mounting bracket 76 is illustrated and will be described in more detail. In the illustrated example, the mounting bracket 76 is unitarily formed as one-piece. However, in other examples, the mounting bracket 76 may be comprised of a plurality of portions (see e.g., mounting bracket 76' in FIG. 12) cooperating together to provide similar capabilities as the unitarily formed mounting bracket 76. Returning to the illustrated example, the mounting bracket 76 facilitates, at least in part, that the hybrid transmission module 64 is a single assembly or module comprised of the hydraulic-electric drive assembly 68, the transmission assembly 72, and the inverter 176. This single assembly or module may then be easily inserted or otherwise positioned into the existing space of the work vehicle 20 and the mounting bracket 76 may be coupled to one or both of the chassis 36 and/or the prime mover or engine 56 of the work vehicle 20.

Figure 11:
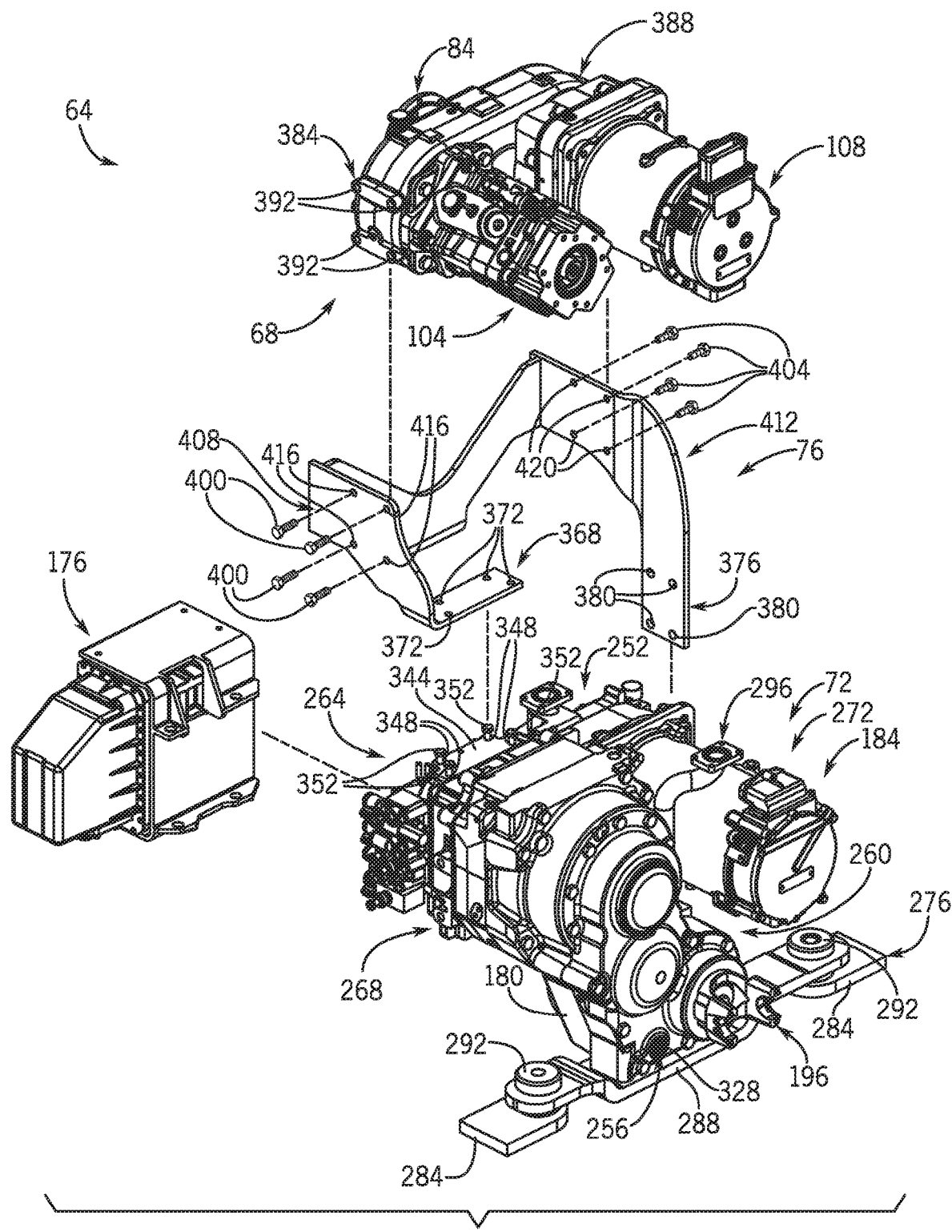
FIG. 11 is an exploded view thereof.

With particular reference to FIG. 11, the transmission assembly 72 includes a top mounting surface 344 defining a plurality of mounting apertures 348 for receiving a first plurality of fasteners 352 and a side mounting surface 356 (see also FIG. 4) defining a plurality of mounting apertures (not shown) for receiving a second plurality of fasteners (not shown). The mounting bracket 76 includes a first mounting flange 368 defining a plurality of apertures 372 orientated in a complementary orientation as the mounting apertures 348 in the top mounting surface 344 of the transmission assembly 72, and a second mounting flange 376 defining a plurality of apertures 380 oriented in a complementary orientation as the mounting apertures 360 in the side mounting surface 356 of the transmission assembly 72. The first mounting flange 368 engages the top mounting surface 344 of the transmission assembly 72, the second mounting flange 376 engages the side mounting surface 356 of the transmission assembly 72, the apertures 372 of the first mounting flange 368 and the apertures 348 of the top mounting surface 344 are aligned, the apertures 380 of the second mounting flange 376 and the apertures 360 of the side mounting surface 356 are aligned, the first plurality of fasteners 352 are inserted into the aligned sets of apertures 348, 372 on the top mounting surface 344 and the first mounting flange 368, and the second plurality of fasteners 364 are inserted into the aligned sets of apertures in the side mounting surface 356 and the second mounting flange 376 to couple the mounting bracket 76 to the transmission assembly 72.

The right and left sides of the hydraulic-electric drive assembly 68 each include mounting surfaces 384, 388 (see also FIGS. 4, 5, and 7 for surface 388) defining a plurality of mounting apertures 392, 396 (see FIG. 5 for apertures 396) for receiving a plurality of fasteners 400, 404. The mounting bracket 76 includes a pair of mounting flanges 408, 412 with one mounting flange 408 disposed on a right side of the mounting bracket 76 and the other mounting flange 412 disposed on the left side of the mounting bracket 76. Each mounting flange 408, 412 defines a plurality of apertures 416, 420 therein complementarily oriented to the mounting apertures 392, 396 defined in the respective right and left sides of the hydraulic-electric drive assembly 68 for mounting the mounting bracket 76 to the hydraulic-electric drive assembly 68. Each mounting flange 408, 412 engages a respective one of the right or left mounting surfaces 384, 388 of the hydraulic-electric drive assembly 68, the apertures 416, 420 of the mounting flanges 408, 412 and the apertures 392, 396 of the mounting surfaces 384, 388 are aligned, and the plurality of fasteners 400, 404 are inserted into the respective aligned sets of apertures to couple the mounting bracket 76 to the hydraulic-electric drive assembly 68.

In one example, the inverter 176 may be mounted to the rear surface 264 of the transmission assembly 72. In such an example, a one or more fasteners may be used to fasten or mount the inverter 176 to the rear surface 264 of the transmission assembly 72. In another example, the inverter 176 may be mounted to the mounting bracket 76. In such an example, the mounting bracket 76 includes one or more mounting flanges defining one or more apertures therein alignable with a respective number of apertures in the inverter 176, and one or more fasteners inserting through the aligned apertures for mounting the inverter 176 to the mounting bracket 76. The mounting bracket 76 is also mountable to one or both of the prime mover 56 and/or the chassis 36 of the work vehicle 20.

In the example configuration of the hybrid transmission module 64, power flow may be described as follows. Rotation input from the engine 56 is transmitted via the drive shaft 80 to the input interface 84 of the hydraulic-electric drive assembly 68. Engagement of the teeth at the periphery of the input interface 84 and the periphery of the associated output interface 88, 92 transmits this rotational power to the ring gear hub 156 by the engaged splines, and at the same time splits the power and effects a gear ratio change to the speed and torque of the apportioned power. The ring gear 160 rotates at the resulting speed and torque and transmits power to planet gears 164, which in turn transmit power to the sun gear 168. Engagement of the planet gears 164 by the ring gear 160 and their engagement of the sun gear 168 effect a gear ratio change in speed and torque transmitted to the shaft 172 of the first electric machine 108, which rotates the rotor therein. In the example embodiment, the positive gear ratio of the gear set steps of the speed (e.g., by a multiple of 3 or so) and reduces the torque between the output interface 88, 92 and the sun gear 168, which allows the first electric machine 108 to operate at higher speeds, and lower torque as compared to the hydraulic pump 104. The first electric machine 108 generates direct current electrical power as a result of operation and the direct current electrical power flows to the inverter 176. The inverter 176 is configured to convert direct current electrical power to alternating current electrical power. The alternating current electrical power flows from the inverter 176 to the second electric machine 184 to power the second electric machine 184. The second electric machine 184 drives the output shaft 188 thereof as desired. The output shaft 188 couples to the gear set 192 within the transmission assembly 72 and through the plurality of gears 192A-192D included in the gear set 192 the power generated by the second electric machine 184 flows through the gear set 192 to the drive output shaft 216. The rotational power of the drive output shaft 216 is conveyed to the drive output members 196, 200, which in turn power the front and rear drive axle assemblies 44, 46 of the work vehicle 20.

Figure 13:
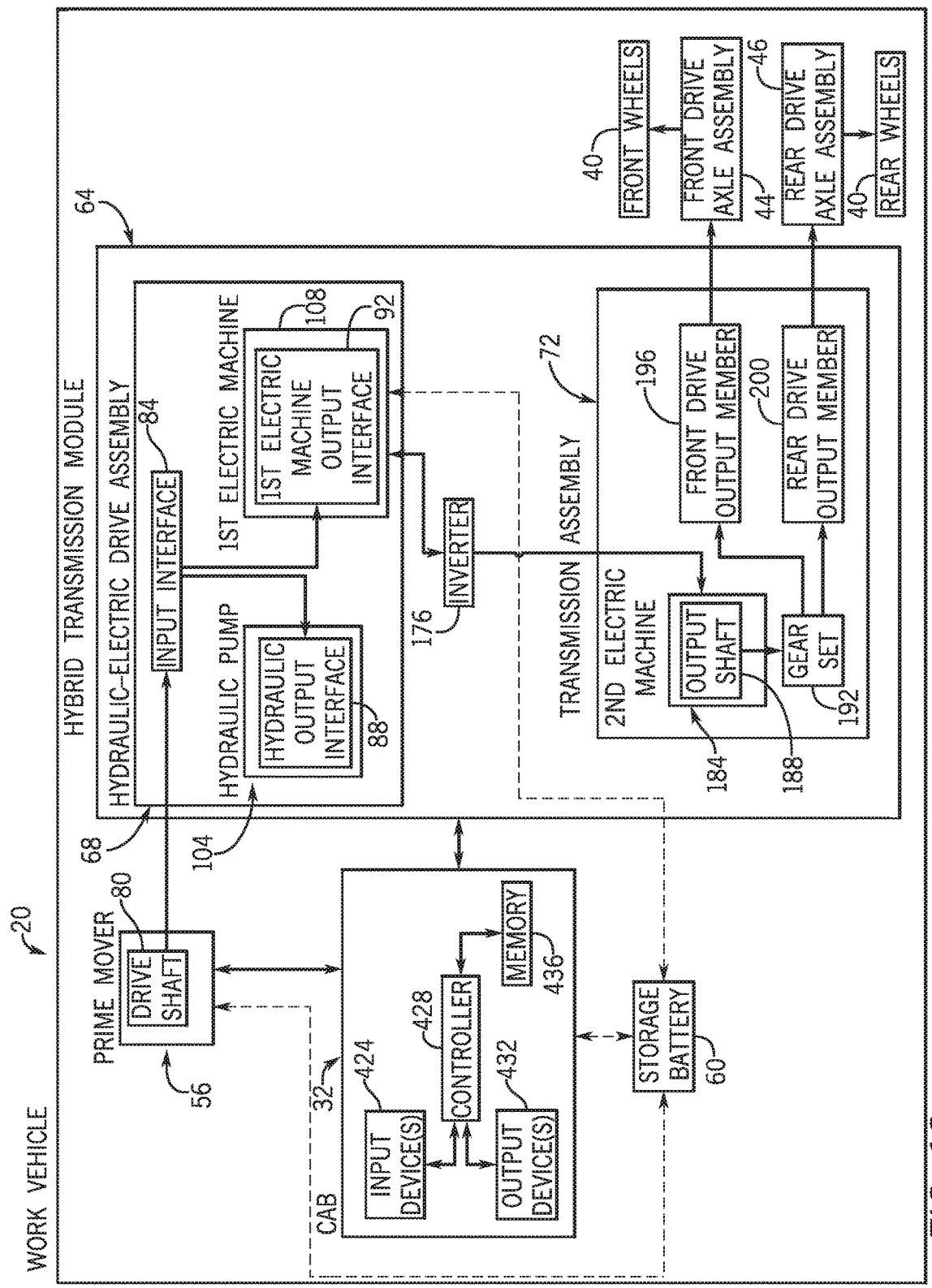
FIG. 13 is a schematic diagram of the hybrid transmission module within the work vehicle.

FIG. 13 is a schematic of one example of the work vehicle 20 and the hybrid transmission module 64 disclosed herein. The schematic representation may not include all features and components of the work vehicle and/or the hybrid transmission module of the present disclosure, but is rather provided to demonstrate at least some of the principles of the present disclosure. In the illustrated example, the work vehicle may include a cab, a prime mover 56, a storage battery 60, a hybrid transmission module 64, a front drive axle assembly 44, a rear drive axle assembly 46, and front and rear wheels 40. The interaction and functionality of most of the components of the work vehicle 20 represented in FIG. 13 are described above. Thus, the following description pertains to some of the components, interaction, and functionality of the work vehicle 20 not yet described.

The cab 32 may have any of various configurations suitable to provide the location of the work vehicle 20 occupied by an operator. The operator cab 32 may include, for example, one or more input devices 424 (e.g., levers, buttons, touch screen capabilities, or any other type of mechanical or electrical (digital or analog) activation to create and/or send signals to one or more controllers 428) and one or more output devices 432 (e.g., monitors, displays, speakers, or any other type of audible and/or visual indicator configured to audibly and/or visually convey information to an operator), manipulatable and/or perceivable by the operator to control operation of the work vehicle 20. The operator cab 32 may also include, for example, one or more controllers 428 having one or more processors configured to execute control commands, code, logic and/or algorithms stored within associated memory 436 or elsewhere. The one or more controllers 428 may be configured to receive, generate, communicate, and transmit signals and control commands from and/or to appropriate components of the work vehicle 20 to effect operation of the work vehicle 20.

For example, an operator or external source may activate one or more input devices 424 which would create a control signal based on the activation of the input device 424. The control signal would be communicated by the input device 424 to the controller 428 and the controller 428 would act in accordance with the received control signal. For example, the controller 428 may generate one or more control commands and transmit the one or more control commands to one or more output devices 432 for consideration and action by the operator, and/or the controller 428 could transmit one or more control commands to one or more other devices (e.g., prime mover 56, storage battery 60, hybrid transmission module 64, etc.) of the work vehicle 20 effecting action of the one or more other devices. The controller 428 may be configured to selectively communicate data/signals/commands to and retrieve data/signals from the memory 436.

Also, the following examples are provided, which are numbered for convenient reference, as follows.

1. A hybrid transmission module for a work vehicle having a chassis and a prime mover carried by the chassis, the hybrid transmission module comprising: a mounting bracket configured to mount to one or more of the chassis and the prime mover; a transmission assembly mounted to the mounting bracket; and a hydraulic-electric drive assembly including a manifold mounted to the mounting bracket, the manifold mounting a hydraulic pump and an electric machine and configured to transfer rotational power from the prime mover to the hydraulic pump and the electric machine; wherein the electric machine, at least in part, drives the transmission assembly.

2. The hybrid transmission module of example 1, wherein the electric machine is configured to generate direct current electrical power, the hybrid transmission module further comprising an inverter mounted to the transmission assembly and electrically coupled to the hydraulic-electric drive assembly to receive the direct current electrical power from the electric machine, wherein the inverter is configured to convert the direct current electrical power to alternating current electrical power.

3. The hybrid transmission module of example 2, wherein the transmission assembly includes a top surface, a bottom surface opposite the top surface, a front surface associated with a front of the work vehicle, a rear surface opposite the front surface and associated with a rear of the work vehicle, wherein the hydraulic-electric drive assembly is positioned vertically above the top surface of the transmission assembly and the inverter is mounted to the rear of the rear surface of the transmission assembly.

4. The hybrid transmission module of example 1, wherein a lubricant path is defined between the hydraulic-electric drive assembly and the transmission assembly to allow lubricant from the hydraulic-electric drive assembly to flow into the transmission assembly.

5. The hybrid transmission module of example 4, wherein the hydraulic-electric drive assembly is positioned vertically above the transmission assembly, and wherein the lubricant is configured to flow through the lubricant path from the hydraulic-electric drive assembly to the transmission assembly due to a gravitational force.

6. The hybrid transmission module of example 4, wherein the lubricant path is comprised of a conduit in fluid communication with the electric machine and the transmission assembly.

7. The hybrid transmission module of example 1, wherein the mounting bracket is a one-piece unitarily formed mounting bracket configured to mount to one or more of the chassis and the prime mover.

8. The hybrid transmission module of example 1, wherein the hydraulic-electric drive assembly includes: a power input interface configured to couple with the prime mover for receiving the rotational power of the prime mover; and a plurality of power output interfaces coupled to the power input interface to transmit the rotational power; wherein the hydraulic pump is mounted to one of the power output interfaces to be driven by the rotational power; and wherein the electric machine is coupled to another one of the plurality of power output interfaces to be driven by the rotational power.

9. The hybrid transmission module of example 1, wherein the electric machine is a first electric machine, and wherein the transmission assembly includes: a transmission housing; a second electric machine mounted to the transmission housing and including an output shaft; a gear set positioned within the transmission housing and coupled to the output shaft of the second electric machine; and a drive output member coupled to the gear set and configured to couple to a drive axle of the work vehicle.

10. The hybrid transmission module of example 9, wherein the first electric machine is configured to generate direct current electrical power, the hybrid transmission module further comprising an inverter mounted to the transmission housing and electrically coupled to the first electric machine to receive the direct current electrical power from the first electric machine, wherein the inverter is configured to convert the direct current electrical power to alternating current electrical power, wherein the second electric machine is configured to receive the alternating current electrical power from the inverter and drive the output shaft.

11. The hybrid transmission module of example 9, wherein the gear set defines a rotational axis about which at least one gear of the gear set rotates, wherein the second electric machine has a longitudinal extent defining a longitudinal axis associated with the longitudinal extent of the second electric machine, wherein the longitudinal axis is offset to a side of the rotational axis of the gear set.

12. The hybrid transmission module of example 9, wherein the hybrid transmission module defines a front associated with a front of the work vehicle, a rear opposite the front and associated with a rear of the work vehicle, a first side associated with a first side of the work vehicle, and a second side opposite the first side and associated with a second side of the work vehicle, wherein the second electric machine is offset to one of the first side or the second side of the gear set.

13. The hybrid transmission module of example 1, wherein the hydraulic pump includes an input fitting and an output fitting, wherein the hydraulic pump is mounted to the manifold at a rotational offset orientation in which the input fitting and the output fitting are spaced from the electric machine.

14. A work vehicle comprising: a chassis; a prime mover carried by the chassis and including a rotational drive shaft for producing rotational power; a mounting bracket configured to mount to the chassis; a hydraulic-electric drive assembly including a manifold mounted to the mounting bracket, a hydraulic pump mounted to the manifold, and an electric machine mounted to the manifold, wherein the hydraulic-electric drive assembly is configured to transfer the rotational power from the prime mover to the hydraulic pump and the electric machine, wherein the electric machine is configured to produce direct current electrical power; an inverter electrically coupled to the electric machine to receive the direct current electrical power from the electric machine and output alternating current electrical power; and a transmission assembly mounted to the mounting bracket and driven by the alternating power from the inverter, wherein the inverter is mounted to the transmission assembly.

15. The work vehicle of example 14, wherein the electric machine is a first electric machine, and wherein the transmission assembly includes a transmission housing, a second electric machine mounted to the transmission housing and including an output shaft, a gear set positioned within the transmission housing and coupled to the output shaft of the second electric machine, and a drive output member coupled to the gear set and configured to couple to a drive axle of the work vehicle; wherein the hydraulic-electric drive assembly is positioned vertically above the transmission assembly; wherein the inverter is mounted to a rear of the transmission housing and is positioned vertically lower than the hydraulic-electric drive assembly; and wherein the second electric machine is offset to a side of the gear set.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments and examples herein were chosen and described to best explain the principles of the disclosure and their practical application, and to enable others of ordinary skill in the art to understand the disclosure and recognize many alternatives, modifications, and variations on the described embodiments and examples. Accordingly, various embodiments and implementations other than those explicitly described are within the scope of the following claims.

What is claimed is:

1. A hybrid transmission module for a work vehicle having a chassis and a prime mover carried by the chassis, the hybrid transmission module comprising:
    a mounting bracket configured to mount to one or more of the chassis or the prime mover;
    a transmission assembly mounted to the mounting bracket; and
    a hydraulic-electric drive assembly including a manifold mounted to the mounting bracket, the manifold mounting a hydraulic pump and an electric machine and configured to transfer rotational power from the prime mover to the hydraulic pump and the electric machine;
    wherein the electric machine, at least in part, drives the transmission assembly; and
    wherein a lubricant path is defined between the hydraulic-electric drive assembly and the transmission assembly to allow lubricant from the hydraulic-electric drive assembly to flow into the transmission assembly.

2. The hybrid transmission module of claim 1, wherein the electric machine is configured to generate direct current electrical power, the hybrid transmission module further comprising an inverter mounted to the transmission assembly and electrically coupled to the hydraulic-electric drive assembly to receive the direct current electrical power from the electric machine, wherein the inverter is configured to convert the direct current electrical power to alternating current electrical power.

3. The hybrid transmission module of claim 2, wherein the transmission assembly includes a top surface, a bottom surface opposite the top surface, a front surface associated with a front of the work vehicle, a rear surface opposite the front surface and associated with a rear of the work vehicle, wherein the hydraulic-electric drive assembly is positioned vertically above the top surface of the transmission assembly and the inverter is mounted to the rear of the rear surface of the transmission assembly.

4. The hybrid transmission module of claim 3, wherein the inverter is positioned vertically lower than the hydraulic-electric drive assembly.

5. The hybrid transmission module of claim 1, wherein the hydraulic-electric drive assembly is positioned vertically above the transmission assembly, and wherein the lubricant is configured to flow through the lubricant path from the hydraulic-electric drive assembly to the transmission assembly due to a gravitational force.

6. The hybrid transmission module of claim 5, wherein the lubricant is configured to flow through the lubricant path from the hydraulic-electric drive assembly to the transmission assembly due solely to a gravitational force.

7. The hybrid transmission module of claim 5, wherein the lubricant path is comprised of a conduit in fluid communication with the electric machine and the transmission assembly.

8. A hybrid transmission module for a work vehicle having a chassis and a prime mover carried by the chassis, the hybrid transmission module comprising:
   a mounting bracket configured to mount to one or more of the chassis or the prime mover;
   a transmission assembly mounted to the mounting bracket; and
   a hydraulic-electric drive assembly including a manifold mounted to the mounting bracket, the manifold mounting a hydraulic pump and an electric machine and configured to transfer rotational power from the prime mover to the hydraulic pump and the electric machine;
   wherein the electric machine, at least in part, drives the transmission assembly; and
   wherein the mounting bracket is either a one-piece unitarily formed mounting bracket configured to mount to one or more of the chassis or the prime mover, or includes a plurality of portions formed separately from each other in which the plurality of portions of the mounting bracket are configured to mount to one or more of the chassis or the prime mover.

9. The hybrid transmission module of claim 1, wherein the hydraulic-electric drive assembly includes:
   a power input interface configured to couple with the prime mover for receiving the rotational power of the prime mover; and
   a plurality of power output interfaces coupled to the power input interface to transmit the rotational power;
   wherein the hydraulic pump is mounted to one of the power output interfaces to be driven by the rotational power; and
   wherein the electric machine is coupled to another one of the plurality of power output interfaces to be driven by the rotational power.

10. The hybrid transmission module of claim 1, wherein the electric machine is a first electric machine, and wherein the transmission assembly includes:
    a transmission housing;
    a second electric machine mounted to the transmission housing and including an output shaft;
    a gear set positioned within the transmission housing and coupled to the output shaft of the second electric machine; and
    a drive output member coupled to the gear set and configured to couple to a drive axle of the work vehicle.

11. The hybrid transmission module of claim 10, wherein the first electric machine is configured to generate direct current electrical power, the hybrid transmission module further comprising an inverter mounted to the transmission housing and electrically coupled to the first electric machine to receive the direct current electrical power from the first electric machine, wherein the inverter is configured to convert the direct current electrical power to alternating current electrical power, wherein the second electric machine is configured to receive the alternating current electrical power from the inverter and drive the output shaft.

12. The hybrid transmission module of claim 10, wherein the gear set defines a rotational axis about which at least one gear of the gear set rotates, wherein the second electric machine has a longitudinal extent defining a longitudinal axis associated with the longitudinal extent of the second electric machine, wherein the longitudinal axis is offset to a side of the rotational axis of the gear set.

13. The hybrid transmission module of claim 12, wherein the longitudinal axis is parallel to the rotational axis.

14. The hybrid transmission module of claim 10, wherein the hybrid transmission module defines a front associated with a front of the work vehicle, a rear opposite the front and associated with a rear of the work vehicle, a first side associated with a first side of the work vehicle, and a second side opposite the first side and associated with a second side of the work vehicle, wherein the second electric machine is offset to one of the first side or the second side of the gear set.

15. A hybrid transmission module for a work vehicle having a chassis and a prime mover carried by the chassis, the hybrid transmission module comprising:
    a mounting bracket configured to mount to one or more of the chassis or the prime mover;
    a transmission assembly mounted to the mounting bracket; and
    a hydraulic-electric drive assembly including a manifold mounted to the mounting bracket, the manifold mounting a hydraulic pump and an electric machine and configured to transfer rotational power from the prime mover to the hydraulic pump and the electric machine;
    wherein the electric machine, at least in part, drives the transmission assembly; and
    wherein the hydraulic pump includes an input fitting and an output fitting, wherein the hydraulic pump is mounted to the manifold at a rotational offset orientation in which the input fitting and the output fitting are spaced from the electric machine.

16. The hybrid transmission module of claim 15, wherein a plane extends through the input fitting and the output fitting and the plane is non-horizontal.

17. A work vehicle comprising:
    a chassis;
    a prime mover carried by the chassis and including a rotational drive shaft for producing rotational power;
    a mounting bracket configured to mount to the chassis;
    a hydraulic-electric drive assembly including a manifold mounted to the mounting bracket, a hydraulic pump mounted to the manifold, and an electric machine mounted to the manifold, wherein the hydraulic-electric drive assembly is configured to transfer the rotational power from the prime mover to the hydraulic pump and the electric machine, wherein the electric machine is configured to produce direct current electrical power;
    an inverter electrically coupled to the electric machine to receive the direct current electrical power from the electric machine and output alternating current electrical power; and
    a transmission assembly mounted to the mounting bracket and driven by the alternating power from the inverter, wherein the inverter is mounted to the transmission assembly;
    wherein a lubricant path is defined between the hydraulic-electric drive assembly and the transmission assembly to allow lubricant from the hydraulic-electric drive assembly to flow into the transmission assembly.

18. The work vehicle of claim 17, wherein the electric machine is a first electric machine, and wherein the transmission assembly includes:
    a transmission housing;
    a second electric machine mounted to the transmission housing and including an output shaft;

a gear set positioned within the transmission housing and coupled to the output shaft of the second electric machine; and a drive output member coupled to the gear set and configured to couple to a drive axle of the work vehicle;

wherein the hydraulic-electric drive assembly is positioned vertically above the transmission assembly;

wherein the inverter is mounted to a rear of the transmission housing and is positioned vertically lower than the hydraulic-electric drive assembly; and wherein the second electric machine is offset to a side of the gear set.

* * * * *